(12) United States Patent
Luneau et al.

(10) Patent No.: US 7,194,077 B2
(45) Date of Patent: Mar. 20, 2007

(54) SYSTEM AND METHOD FOR ACQUIRING INFORMATION RELATING TO GEOGRAPHIC LOCATION

(76) Inventors: David J. Luneau, 274 Gage Hill Rd., Concord, NH (US) 03302; Ray F. Chadwick, 101 Powder Hill Rd., Bedford, NH (US) 03110

( * ) Notice: Subject to any disclaimer, the term of this patent is extended or adjusted under 35 U.S.C. 154(b) by 285 days.

(21) Appl. No.: 10/651,063

(22) Filed: Aug. 28, 2003

(65) Prior Publication Data
US 2005/0047572 A1    Mar. 3, 2005

(51) Int. Cl.
*H04M 3/42* (2006.01)
(52) U.S. Cl. ............... 379/201.05; 379/201.01
(58) Field of Classification Search ...............
379/201.01–261.1, 67, 1, 88.17; 455/3.04
See application file for complete search history.

(56) References Cited

U.S. PATENT DOCUMENTS

| | | | |
|---|---|---|---|
| 5,390,237 A * | 2/1995 | Hoffman et al. | 379/88.23 |
| 6,753,784 B1 * | 6/2004 | Sznaider et al. | 340/601 |
| 2004/0080430 A1 | 4/2004 | Videtich | |
| 2004/0235416 A1 * | 11/2004 | Chan et al. | |
| 2005/0009508 A1 * | 1/2005 | Graske et al. | |

OTHER PUBLICATIONS

Consumer Electronics Association's Audio Systems Committee, "Draft CEA-2009, Receiver Performance Specification for Public Alert Receivers", Nov. 14, 2003.
National Weather Service, "NOAA Weather Radio—Using NWR SAME", Oct. 8, 2003, http://205.156.54.206/nwr/same.htm.
National Weather Service, "National Weather Service, NOAA Weather Radio (NWR) Transmitters, NWR Specific Area Message Encoding, NWR SAME", Jul. 13, 1999.
National Weather Service, "Filler Facts: NOAA Weather Radio" (undated) http://www.nws.noaa.gov/pa/secnews/factflash/nwrfact.htm.
RadioShack product packaging, "Selectable Alert Weatheradio, Specific Area Message Encoding" (including Owner's Manual bearing a copyright date of 1999 Tandy Corporation).

* cited by examiner

*Primary Examiner*—William J. Deane, Jr.
(74) *Attorney, Agent, or Firm*—Fish & Richardson P.C.

(57) ABSTRACT

A system and method provides data representative of geographical information to equipment for providing weather-related information, such as a NOAA weather radio (NWR). A telephone call is placed over a telephone network from the equipment to an information server, which receives information corresponding to an origin of the telephone call in conjunction with the telephone call. The received information is processed to generate data representative of geographical information, which is then sent to the equipment in conjunction with the telephone call. The equipment is then programmed using the data representative of geographical information to provide geographically based weather-related information.

29 Claims, 4 Drawing Sheets

SYSTEM AND METHOD FOR ACQUIRING INFORMATION RELATING TO GEOGRAPHIC LOCATION

TECHNICAL FIELD

This invention relates to acquiring information pertaining to the geographic location of an apparatus, such as a weather radio, a television set, a telephone, and/or an emergency messaging terminal.

BACKGROUND

During the installation process, certain products require the owner to program information into the device that corresponds to the geographic location of the product. This is typically done for products that modify their behavior, performance, or characteristics based on such information.

One example of such a product is the NOAA weather radio. The National Oceanic and Atmospheric Administration (NOAA) provides a broadcast radio service for transmitting weather-related information and all-hazards alerts to specialized radio receivers. These NOAA Weather Radio (NWR) receivers can be tuned to radio frequencies used to broadcast regional weather information and all-hazards alerts. Recent advances to the NOAA broadcast transmission provide the potential for greater localized specificity of alerts. A new NWR alert messaging encoding scheme called SAME (Specific Area Message Encoding) allows NWR receivers to select only messages that contain a code that matches a code programmed into the receiver. However, the user must program the NWR receiver with information corresponding to the receiver's geographic location in order for the NWR receiver to discriminate locally specific information contained in the broadcast. This process typically involves looking up and entering a six-digit code into the NWR receiver that corresponds to the receiver's geographic location.

After buying an NWR receiver capable of receiving all-hazards alert messages using the SAME encoding scheme, the user must program their county, parish, or city into the radio. The NWR will then alert only for weather and other emergencies for the county(ies) programmed. NWR receivers without the SAME capability will respond to any alert within the coverage area of the NWR transmitter, typically several counties, even though the emergency could be well away from the listener. To program NWR SAME receivers with the proper county(ies) of choice, the user needs to know the six-digit SAME code number(s) for that county(ies). The numbers are available online through the NOAA website and by telephone using an interactive voice menu. After determining the numbers, the user must follow the directions supplied the manufacturer of the NWR SAME receiver for programming.

While the process may seem simple to technically capable individuals, it requires proficiency in reading the owner's manual, ability to understand and follow a sometimes-complicated series of steps without making a mistake, and the diligence to re-program the NWR should the radio be moved to another location.

Thomson Consumer Electronics Company has introduced a line of television sets that incorporate a NWR receiver. The location-based codes are set up through an interface using the television screen. This arrangement requires the user to operate the remote control and identify the specific State, county, and portion of the county in which the television is located. While this product provides the user with a graphical interface for programming, it still requires the user to program the apparatus manually. Therefore, it would have to be programmed manually upon initial setup, and every time the television set is moved, such as to a new city or town. If the owner's manual or remote control is ever lost, programming could prove to be more difficult. Furthermore, those who rely on the television set for providing accurate alerts to life threatening situations may not know that the set needs to be re-programmed, and could be under the false impression that the set continues to provide all-hazards alert notification.

U.S. Pat. No. 6,526,268 to Marrah describes a method for a mobile NWR receiver to use Global Positioning System (GPS) technology to acquire its precise location and cross-reference that location with a set of geographically related codes. The inclusion of GPS technology makes it possible for a mobile (or in-vehicle) NWR to dynamically update its location-based programming codes, but would add significant cost to a fixed-location radio. Also, because the database of geographically related codes is stored in the apparatus' memory, that database must be kept up to date as additional codes are implemented.

SUMMARY

One aspect of the invention concerns a system and method for providing data representative of geographical information to equipment for providing weather-related information, such as a NOAA weather radio (NWR). A telephone call is placed over a telephone network from the equipment to an information server, which receives information corresponding to an origin of the telephone call in conjunction with the telephone call. The received information is processed to generate data representative of geographical information, which is then sent to the equipment in conjunction with the telephone call. The equipment is then programmed using the data representative of geographical information to provide geographically based weather-related information.

In this aspect of the invention, the equipment can be programmed without the need for manual user lookup and entry of codes or data representative of the geographical location of the equipment. Moreover, because the geographical information is automatically provided over a common telephone network, there is no need for an expensive GPS receiver.

In embodiments of this aspect of the invention, the data representative of geographical information is a code indicating the geographical location of the equipment, such as the Specific Message Area Encoding (SAME) code. The equipment directly connects to the telephone network, and places the telephone call (e.g., a toll-free telephone call) in response to a configuration command from a user. The processing of information received in connection with the telephone call (e.g., automatic number identification and/or Incoming Caller Line Identification signal) involves the information server querying a database that associates telephone numbers with data representative of geographical information. The information server uses the telephone number from which the call was placed to query the database to determine the data representative of geographical information associated with the telephone number. The data representative of geographical information is then sent back to the equipment using, e.g., Frequency Shift Keyed signals or Dual Tone Multiple Frequency signals.

Another aspect of the invention concerns apparatus for providing weather-related information. The apparatus (e.g., NOAA Weather Radio receiver) includes a telephone jack for connecting to a telephone network, a telephone call provisioning circuit for placing a telephone call over the telephone network, a data receiver circuit (e.g., configured to receive Frequency Shift Keyed signals and/or Dual Tone Multiple Frequency signals) for receiving data representative of geographical information (e.g., a Specific Message Area Encoding code), and a programming circuit for using the data representative of geographical information to provide geographically based weather-related information.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
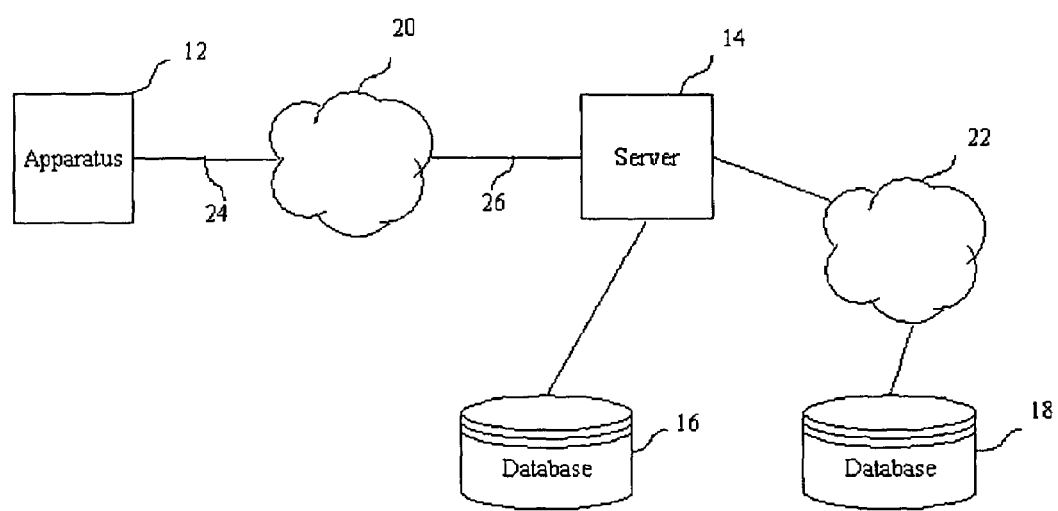
FIG. 1 is a block schematic diagram of a system in which an apparatus acquires information corresponding to its geographic location in accordance with one embodiment of the invention.

FIG. 1 is a diagram of system 10 for apparatus 12 to acquire data corresponding to its geographic location. Apparatus 12 is connected through connection 24 to network 20, e.g., a telephone network, to contact server 14 using connection 26. Server 14 is able to determine the identity of network connection 24 used by apparatus 12 for connecting to network 20. Server 14 queries database 16 to get the geographic location of apparatus 12 based on the identity of connection 24. If database 16 is not a locally accessible resource, server 14 may query database 18 accessible via network 22, e.g., the Internet, for the same purpose. Once server 14 has the geographic location data for apparatus 12, server 14 processes the data, converts it into data corresponding to the geographic location of apparatus 12, converts the data into a format useful to apparatus 12, and sends the converted data to apparatus 12.

Figure 2:
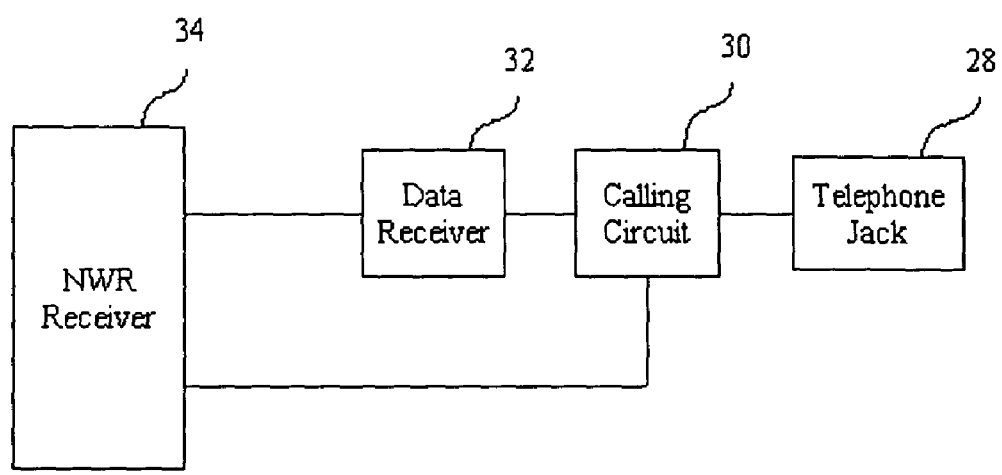
FIG. 2 is a block schematic diagram of weather radio equipment for use in the system of FIG. 1.

FIG. 2 is a block diagram showing features of apparatus 12. Apparatus 12 includes a telephone jack 28, a telephone call provisioning circuit 30, a data receiver circuit 32, and a programmable NWR receiver 34. Telephone jack 28 connects to the telephone network 20. Telephone call provisioning circuit 30 places the telephone call over the telephone network 20. The data receiver circuit 32 is a Frequency Shift Keyed (FSK) signal receiver (alternatively, a Dual Tone Multiple Frequency (DTMF) signal receiver) for receiving data representative of geographical information, e.g., the SAME code, over the telephone network 20. The SAME code is used to automatically program the programmable NWR receiver 34.

Figure 3:
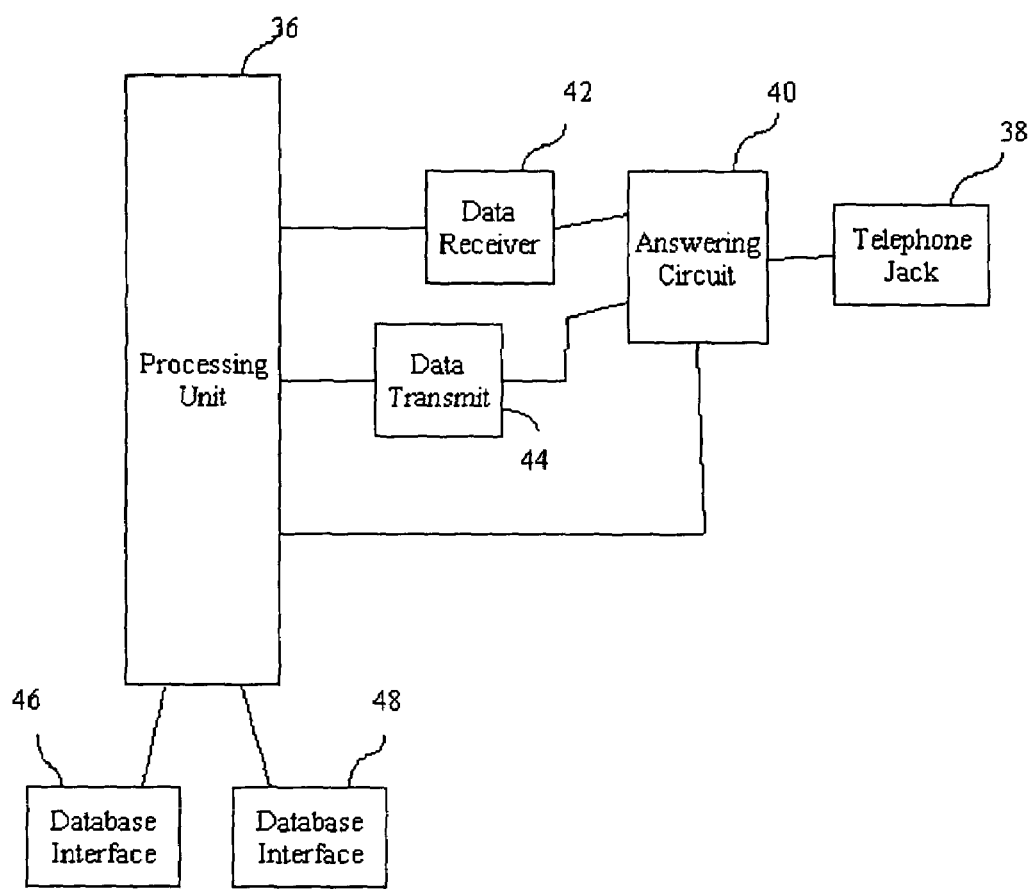
FIG. 3 is a block schematic diagram of information server equipment for use in the system of FIG. 1.

FIG. 3 is a block diagram showing features of server 14. Server 14 includes a processing unit 36, telephone jack 38, an answering circuit 40, a data receiver circuit 42, a data transmission circuit 44, an interface 46 to database 16, and an interface 48 to networked database 18. Telephone jack 38 connects to the telephone network 20. The answering circuit 40 connects to jack 38 and provides telephone network signaling protocol functions and termination for incoming telephone calls. The data receiver circuit 42 is a Frequency Shift Keyed (FSK) signal receiver for receiving the identity of connection 24 used by apparatus 12 to make the call. Data transmitter 44 is a Frequency Shift Keyed (FSK) signal transmitter for transmitting signals over answering circuit 40 and onto network 20. Interface 46 provides a direct connection between server 14 and database 16, and interface 48 provides a networked connection between server 14 and database 18.

Figure 4:
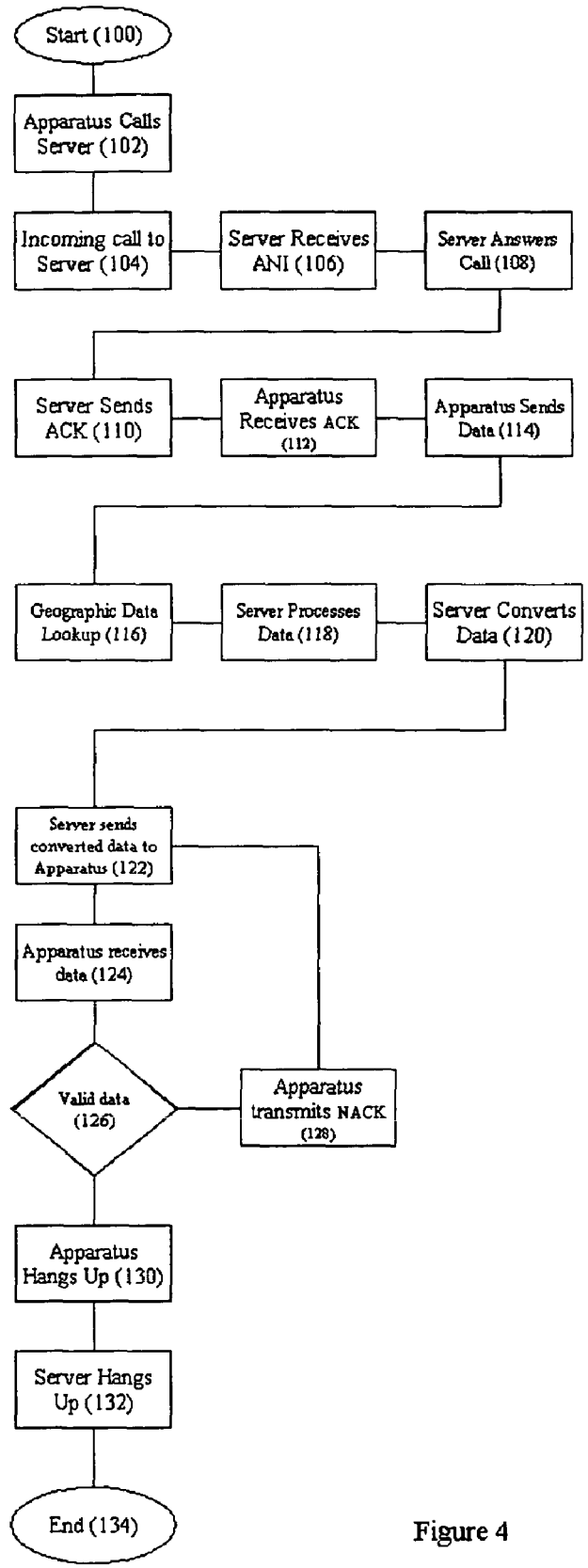
FIG. 4 is a flow chart of a method used by the system of FIG. 1 to acquire information corresponding to its geographic location in accordance with one embodiment of the invention.

FIG. 4 is a flow chart of the method used by system 10 for acquiring the geographic location data of apparatus 12, processing the data into data corresponding to the geographic location of apparatus 12, converting the data into a format useful to apparatus 12, and finally apparatus 12 receiving the converted data corresponding to its geographic location.

In step 102 of the preferred embodiment, the telephone call provisioning circuit 30 of apparatus 12 makes a telephone call to server 14 by going off-hook on connection 24, which is connected to network 20, and dialing the server's toll-free telephone number, such as an 800-number. Network 20 routes the call to server 14 over network connection 26.

In step 104, network 20 alerts server 14 to an incoming call on connection 26. In this process of alerting, network 20 provides server 14 with the identity of connection 24 used by apparatus 12 for making the call. In the case of a toll-free number telephone call, the identity can be the automatic number identification (ANI). ANI is a feature common to toll-free inbound telephone services. Additionally or alternatively, the identity can be the Incoming Caller Line Identification (ICLID) signal.

In step 106, server 14 receives the identity of connection 24. In step 108, server 14 answers the incoming toll-free call, causing a stable two-way communications link from apparatus 12 to server 14 through network 20.

In step 110, server 14 transmits an acknowledgement tone over network 20 to apparatus 12 indicating if the ANI was received properly and indicating that server 14 is ready to communicate with apparatus 12. In step 112, the data receiver circuit 32 of apparatus 12 receives the acknowledgement tone from server 14 indicating the status of the received ANI and the server's readiness to receive data.

In step 114, apparatus 12 sends data to server 14. This data can include information as a substitute for ANI (if the ANI was not received properly), as well as other data, such as serial number, data pertaining to the functionality of apparatus 12, or data pertaining to user identification, preferences or selection of functions for apparatus 12. Where apparatus 12 is a NWR, this data can also include the user's preference for all-hazard and weather alerts for a specific geographic location as well as adjacent and/or regional locales. Apparatus 12 provides an interface for the user to make such preference selections using a keypad in response to prompts, which can be server-generated and/or locally generated, appearing on a display.

In step 116, server 14 queries database 16 for the geographic location of apparatus 12 based on the ANI associated with network connection 24, or in the absence of the ANI, based on the data sent by apparatus 12 in step 114. In step 118, server 14 processes the geographical location data along with any data received from apparatus 12 into data corresponding to the geographic location. In step 120, server 14 converts the processed data into a format useful to apparatus 12, such as a six-digit code for SAME-equipped NWR receivers. In step 122, server 14 sends the converted data over network 20 to the data receiver circuit 32 of apparatus 12. The data transmission can be in the form of frequency-shift keyed data according to Telcordia GR30, commonly used for data transmission over the telephone network. One advantage of GR30 is the provision of a checksum that can be used by the receiver to validate the data.

In step 124, the data receiver circuit 32 of apparatus 12 receives the data sent over network 20 from server 14. Apparatus 12 validates the data. If the data is not valid, processing goes to step 128 where apparatus 12 sends a NACK tone over network 20 to server 14. Processing then continues back at step 122 for re-transmission of the data.

If apparatus 12 received valid data, at step 130 apparatus 12 hangs up network connection 24. At step 132, server 14 hangs up. The valid data are then used to program the programmable NWR receiver 34.

While a particular embodiment has been illustrated and described, various changes and modifications can be made without sacrificing the advantages and features provided by the principles, constructions, and operations disclosed herein. Other embodiments are within the scope of the following claims.

What is claimed is:

1. A method of providing data representative of geographical information to equipment for providing weather-related information, the method comprising:
   placing a telephone call over a telephone network from the equipment to an information server;
   receiving at the information server, in conjunction with the telephone call, information corresponding to an origin of the telephone call;
   processing the received information to generate data representative of geographical information;
   sending the data representative of geographical information to the equipment in conjunction with the telephone call;
   programming the equipment using the data representative of geographical information to provide geographically based weather-related information.

2. The method of claim 1 wherein the equipment is a NOAA Weather Radio receiver.

3. The method of claim 2 wherein the data representative of geographical information is a code indicating the geographical location of the equipment.

4. The method of claim 3 wherein the code is a Specific Area Message Encoding code.

5. The method of claim 1 wherein the equipment directly connects to the telephone network.

6. The method of claim 5 wherein the equipment places the telephone call in response to a configuration command from a user.

7. The method of claim 1 wherein the processing step includes the information server querying a database.

8. The method of claim 7 wherein the database associates telephone numbers with data representative of geographical information.

9. The method of claim 8 wherein the information corresponding to the origin of the telephone call is the telephone number from which the call was placed.

10. The method of claim 9 wherein the processing step includes the information server querying the database to determine the data representative of geographical information associated with the telephone number from which the call was placed.

11. The method of claim 1 wherein the data representative of geographical information is sent to the equipment using Frequency Shift Keyed signals.

12. The method of claim 1 wherein the data representative of geographical information is sent to the equipment using Dual Tone Multiple Frequency signals.

13. The method of claim 1 wherein the telephone call is a toll-free telephone call.

14. The method of claim 1 wherein the information corresponding to the origin of the telephone call is automatic number identification.

15. The method of claim 1 wherein the information corresponding to the origin of the telephone call is an Incoming Caller Line Identification signal.

16. A system for providing data representative of geographical information to equipment for providing weather-related information, the system comprising:
   means for placing a telephone call over a telephone network from the equipment to an information server;
   means for receiving at the information server, in conjunction with the telephone call, information corresponding to an origin of the telephone call;
   means for processing the received information to generate data representative of geographical information;
   means for sending the data representative of geographical information to the equipment in conjunction with the telephone call;
   means for programming the equipment using the data representative of geographical information to provide geographically based weather-related information.

17. The system of claim 16 wherein the equipment is a NOAA Weather Radio receiver.

18. The system of claim 16 wherein the data representative of geographical information is a code indicating the geographical location of the equipment.

19. The system of claim 18 wherein the code is a Specific Area Message Encoding code.

20. The system of claim 16 wherein the means for processing includes means for the information server querying a database.

21. The system of claim 20 wherein the database associates telephone numbers with data representative of geographical information.

22. The system of claim 21 wherein the information corresponding to the origin of the telephone call is the telephone number from which the call was placed.

23. The system of claim 22 wherein the means for processing includes means for the information server querying the database to determine the data representative of geographical information associated with the telephone number from which the call was placed.

24. Apparatus for providing weather-related information, comprising:
   a telephone jack for connecting to a telephone network;
   a telephone call provisioning circuit for placing a telephone call over the telephone network;
   a data receiver circuit for receiving data representative of geographical information;
   a programming circuit for using the data representative of geographical information to provide geographically based weather-related information.

25. The apparatus of claim 24 wherein the apparatus is a NOAA Weather Radio receiver.

26. The apparatus of claim 25 wherein the data representative of geographical information is a code.

27. The apparatus of claim 26 wherein the code is a Specific Message Area Encoding code.

28. The apparatus of claim 24 wherein the data receiver circuit is configured to receive Frequency Shift Keyed signals.

29. The apparatus of claim 24 wherein the data receiver circuit is configured to receive Dual Tone Multiple Frequency signals.

* * * * *